United States Patent
Audren et al.

(10) Patent No.: US 6,948,595 B2
(45) Date of Patent: Sep. 27, 2005

(54) MULTIPLE-DISC BRAKE ELECTROMECHANICAL ACTUATOR FOR TRANSPORT MEANS, IN PARTICULAR FOR AN AEROPLANE

(75) Inventors: Jean-Thierry Audren, Saint-Rémy-les-Chevreuses (FR); Daniel Bezanere, Antony (FR)

(73) Assignee: Sagem S.A. (FR)

( * ) Notice: Subject to any disclaimer, the term of this patent is extended or adjusted under 35 U.S.C. 154(b) by 0 days.

(21) Appl. No.: 10/466,441

(22) PCT Filed: Jan. 16, 2002

(86) PCT No.: PCT/FR02/00161
§ 371 (c)(1),
(2), (4) Date: Oct. 22, 2003

(87) PCT Pub. No.: WO02/057649
PCT Pub. Date: Jul. 25, 2002

(65) Prior Publication Data
US 2004/0089505 A1 May 13, 2004

(30) Foreign Application Priority Data
Jan. 18, 2001 (FR) ............................................. 01 00669

(51) Int. Cl.$^7$ ............................................. F15D 55/08
(52) U.S. Cl. ..................................... 188/72.8; 188/71.9
(58) Field of Search ............................... 188/72.7, 72.8, 188/71.9, 72.1, 71.5, 71.7, 71.8

(56) References Cited

U.S. PATENT DOCUMENTS

| 3,952,844 | A | * | 4/1976 | Newstead et al. ......... 188/72.8 |
| 4,721,190 | A | * | 1/1988 | Schmidt et al. ............ 188/71.9 |
| 4,809,824 | A | | 3/1989 | Fargier et al. |
| 6,173,820 | B1 | | 1/2001 | Blosch et al. |
| 6,189,661 | B1 | * | 2/2001 | Schaffer .................... 188/72.8 |
| 6,767,305 | B2 | * | 7/2004 | Backes et al. ............. 188/72.8 |

FOREIGN PATENT DOCUMENTS

WO WO 200060255 A1 * 10/2000 ........... F16C/19/16

* cited by examiner

*Primary Examiner*—Melanie Torres
(74) *Attorney, Agent, or Firm*—Gerald E. Hespos; Anthony J. Casella (57) ABSTRACT

An electromechanical multiple-disk brake actuator is provided. The actuator includes a first reversible assembly with a central screw, a first electric motor rotating the screw, a first nut displaceable over the screw when the screw is rotated and a connection between the screw and the nut permit reversible displacement. The actuator also has a second non-reversible assembly including an annular screw on the first nut, a second electric motor for rotating the annular screw and the first nut, and a second nut fixed to a frame but axially displaceable over the annual screw when the annular screw is rotated. A piston at one of the ends of the second nut presses the disk against one another to ensure braking.

12 Claims, 7 Drawing Sheets

MULTIPLE-DISC BRAKE ELECTROMECHANICAL ACTUATOR FOR TRANSPORT MEANS, IN PARTICULAR FOR AN AEROPLANE

The present invention relates to an electromechanical multiple-disk brake actuator for a means of transport, in particular for an aircraft, as well as to a multiple-disk brake controlled by several actuators of this type.

Electromechanical actuators presently used for applying the multiple-disk brakes of an aircraft are of large dimensions. Now, as the locations intended to accommodate them are very confined, long and difficult, hence costly, operations have to be performed in order to install and remove them.

Such actuators further have a limited operating stroke. To ensure absolutely safe braking, it is thus necessary to replace the brake disks well before they are completely worn out, which, however, entails high maintenance costs.

The present invention more especially proposes to overcome these drawbacks and, to do so, it provides an electromechanical multiple-disk brake actuator, which is characterized in that it includes, mounted on a frame:

a first, reversible assembly including a central screw, a first electric motor for rotating the central screw, a first nut axially displaceable over the central screw when the latter is rotated, and means interposed between the central screw and the first nut to permit reversible displacement of one, at least, of these two members; and a second, non-reversible assembly including an annular screw externally integral with the first nut, a second electric motor for rotating the annular screw and the first nut, a second nut locked against rotation in relation to the frame but axially displaceable over the annular screw when the latter is rotated, the annular screw and the second nut being in engagement via their threads which make their displacement non-reversible, and a piston provided at one of the ends of the second nut to press the disks against one another in order to ensure the service braking of the means of transport during actuation of the first motor, and parking braking during actuation of the second motor.

The first assembly is designed to be reversible so that the central screw can rotate when a pressure is exerted axially upon the first nut.

The second assembly is, for its part, designed to be non-reversible so that the annular screw cannot rotate when a pressure is exerted axially upon the piston.

Thanks to the concentric structure of the screws and the nuts, the actuator according to the invention is far less bulky than present electromechanical actuators. It can thus be installed and removed more easily and more quickly.

Preferably, the means provided to permit reversible displacement of the central screw and/or of the first nut are constituted by a roller bearing mechanism or a ball bearing mechanism.

According to one preferred form of embodiment of the invention, the central screw comprises, on the opposite side from the piston, a cylindrical skirt provided externally with a ring gear meshing with an intermediate gear, itself meshing with a gear keyed on the output shaft of the first motor.

As to the annular screw, it comprises, on the side opposite from the piston, a cylindrical prolongation at least partially surrounding the skirt of the central screw and provided externally with a ring gear meshing with an intermediate gear, itself meshing with a gear keyed on the output shaft of the second motor.

As the two ring gears are located on the same side, opposite from the brake disks, the actuator according to the invention can be designed to have a height that is far less than that of present electromechanical actuators, which gives more space in which to install the multiple disks. These disks can thus be more numerous and/or thicker and ensure a longer service life.

Advantageously, the central screw is axially displaceable, against the action of pre-compressed elastic members, in the direction wherein it moves away from the multiple disks during parking braking.

Thanks to this arrangement, parking braking of the means of transport can be ensured in perfect safety, whether the disks are very hot, following service braking, or whether they are cold.

When the disks cool down, their contraction is, in fact, compensated for by the elastic members, which are able to expand. Parking braking continues to be ensured, however, once the disks have cooled down, as the elastic members, by virtue of their construction, remain pre-compressed.

Preferably, the elastic members are disposed in an annular housing provided in the frame, coaxially with the central screw, and pre-compressed between the end of the housing located opposite from the multiple disks and an annular collar borne by a bearing against which bears a stub shaft axially prolonging the central screw, the collar being pressed against the other end of the housing during service braking and not during parking braking.

According to the invention, the elastic members can be deformable washers.

In order to make the actuator according to the invention particularly compact, it is preferable for the annular housing of the frame to extend, at least partially, inside the cylindrical skirt of the central screw.

Advantageously, the central screw bears a circular wall extending perpendicularly to its axis of rotation, with this wall itself bearing the cylindrical skirt at its periphery and being provided, on its outer face, with a protuberance against which a protuberance, provided on the first nut and having a matching shape, is designed to bear during parking braking.

Thanks to this arrangement, there is no risk of the first nut remaining jammed after being fully screwed down on the central screw. Indeed, as the protuberances come into contact with one another in a movement that is substantially perpendicular to their contact surfaces when the first nut is fully screwed down, it suffices to rotate the central screw in the opposite direction in order to unscrew the first nut without the slightest difficulty.

Preferably, a sensor is provided in order to determine the angular position of the output shaft of the first motor and to indicate the distance that the piston has to travel in order to perform a service braking operation.

It is thus possible to take the steps necessary in order to take up the play due to wear of the disks.

The present invention also relates to a multiple-disk brake for a means of transport, in particular for an aircraft, control of which is ensured by several actuators of the type just described.

One form of embodiment of the present invention will be described below by way of an in no way limitative example, with reference to the annexed drawings, wherein.

The electromechanical actuator shown in the drawings was developed to control an aircraft brake but there is nothing to prevent it from being used to control a land vehicle brake, for example the brake of a heavy truck.

This actuator includes a first, reversible assembly comprising a central screw 1 designed to be rotated by a first electric motor 2, a first nut 3 axially displaceable on screw 1 when the latter is rotated, and means 4 interposed between screw 1 and nut 3 in order to permit reversible displacement of at least one of these two members.

It is to be noted here that means 4 can be constituted, in a manner known per se, by a roller bearing mechanism or a ball bearing mechanism.

The actuator also includes a second, non-reversible assembly comprising an annular screw 5 surrounding the first nut 3 while being fixedly connected to the latter, a second motor 6, designed to rotate annular screw 5 and first nut 3, a second nut 7, the thread of which engages with that of the annular screw and which is axially displaceable thereon when the screw is rotated, and a piston 8 integral with the end of second nut 7 that faces the brake.

The first and second assemblies are mounted on a common frame 9, in relation to which second nut 7 is locked against rotation.

Frame 9 is, in fact, provided with a groove 10 extending parallel to the axis of central screw 1 and in which a finger 11, borne by the second nut, is displaceable longitudinally when annular screw 5 is rotated.

At its end opposite from piston 8, central screw 1 is provided with a circular wall 12 extending perpendicularly to its axis of rotation and bearing a cylindrical peripheral skirt 13.

This skirt, which is located at the end opposite from piston 8, is provided, on its free end, with an external ring gear 14 meshing with an intermediate gear 15, itself meshing with a gear 16 keyed on the output shaft of first motor 2.

It is thus thanks to this particular arrangement that first motor 2 can rotate central screw 1.

At its end opposite from piston 8, annular screw 5 is provided with a cylindrical prolongation 17 surrounding, to a large extent, skirt 13 of central screw 1 and bearing, on its free end, an external ring gear 18 meshing with an intermediate gear 19, itself meshing with a gear 20 keyed on the output shaft of second motor 6.

This special arrangement makes it possible, of course, for second motor 6 to rotate annular screw 5.

It should be noted here that ring gears 14 and 18 are close to one another and that their teeth are relatively long, for reasons which will be self-evident hereinafter.

Central screw 1 is prolonged axially inside skirt 13 by a stub shaft 21 which bears on a bearing 22 provided on its outer face with an annular collar 23.

This collar is pressed against the upper end of an annular housing 24 provided in frame 9, by pre-compressed elastic members 25, which are disposed in housing 24, between collar 23 and the lower end of the housing.

In the form of embodiment shown, the elastic members are deformable washers of the Belleville, or other, type.

Figure 1:
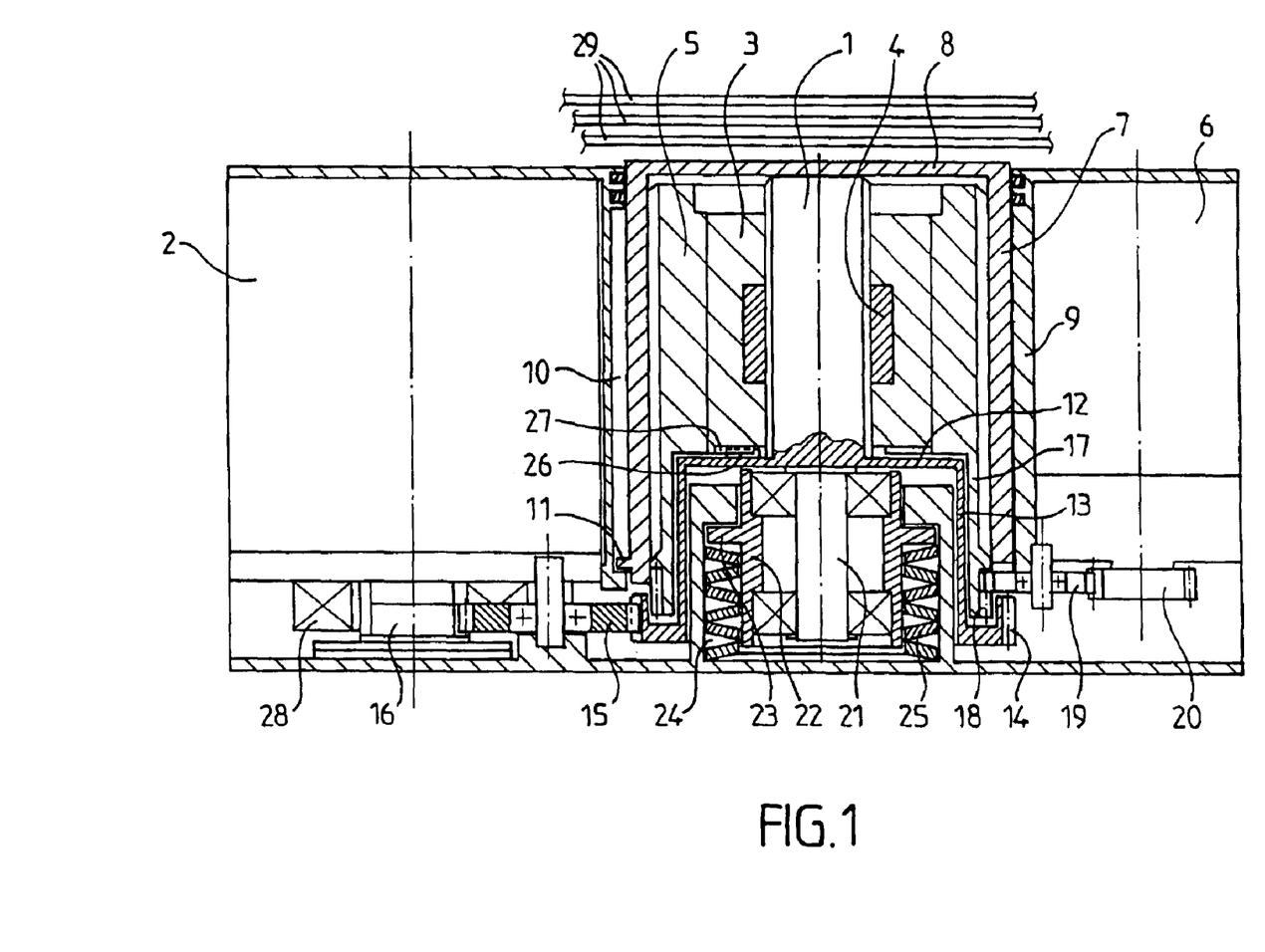
FIG. 1 is a schematic cross-sectional view of a multiple-disk brake actuator according to the invention, the brake not being applied, and comprising new disks.

It should be noted, moreover, that circular wall 12 of central screw 1 bears, on its outer face, a protuberance 26 against which a protuberance 27, provided on the adjacent end of first nut 3 is designed to come to bear when the latter is fully screwed down, on central screw 1, as shown in FIG. 1.

Thanks to these protuberances, which come into contact without becoming being coupled together when nut 3 is fully screwed down, the latter can be unscrewed without the slightest difficulty since it is impossible for any jamming to occur between circular wall 12 and nut 3.

For the sake of completeness, it should be pointed out that a sensor 28 is provided to determine the angular position of the output shaft of first motor 2 and to indicate the distance to be travelled by piston 8 in order to perform a service braking operation.

Knowledge of this distance makes it possible, in fact, to control motor 2 appropriately so that piston 8 can be systematically brought closer to disks 29 of the brake so as to take up the play due to the wear of the disks.

The operation of the electromechanical actuator according to the invention will now be described with reference to FIGS. 1 to 7.

It should be noted, first of all, that FIG. 1 shows the actuator as it is when not applying brake disks 29, which are new.

In this case, first nut 3 is fully screwed down on central screw 1, elastic members 25 press annular collar 23 of bearing 22 against the upper end of housing 24 provided in frame 9, and piston 8, which is retracted, is away from disks 29.

Figure 2:
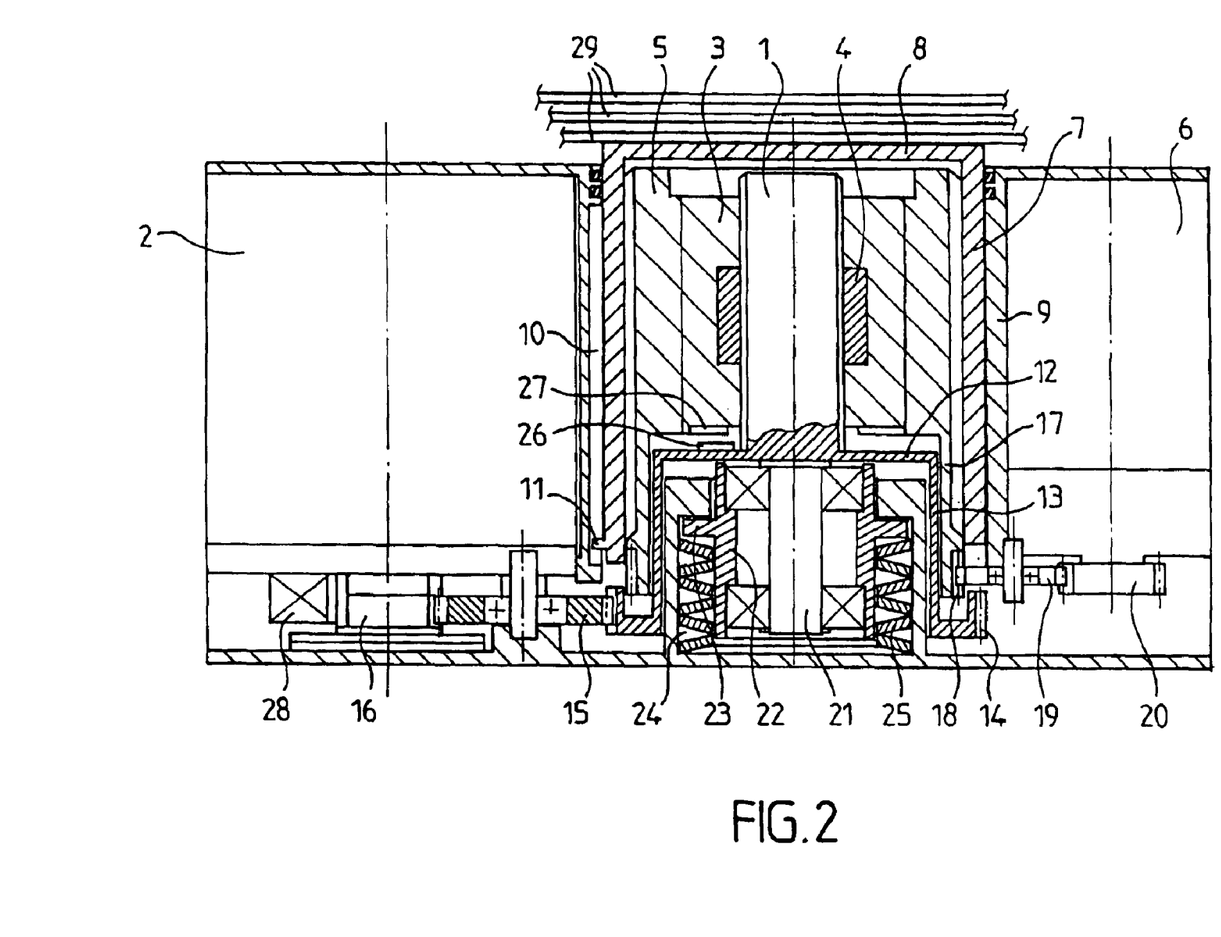
FIG. 2 is a schematic cross-sectional view showing the actuator during a service braking operation with new disks.

FIG. 2 shows the actuator during a service braking operation with new disks 29.

To perform this braking operation, first motor 2 has rotated central screw 1 in the direction in which the assembly including first nut 3, annular screw 5 and second nut 7 has moved axially over central screw 1 to enable piston 8 to press disks 29 firmly against one another.

It will be noted that, by reason of their relatively long length, the teeth of ring gear 18 continue to mesh with those of gear 19, despite the displacement of annular screw 5 in the direction of disks 29.

Figure 3:
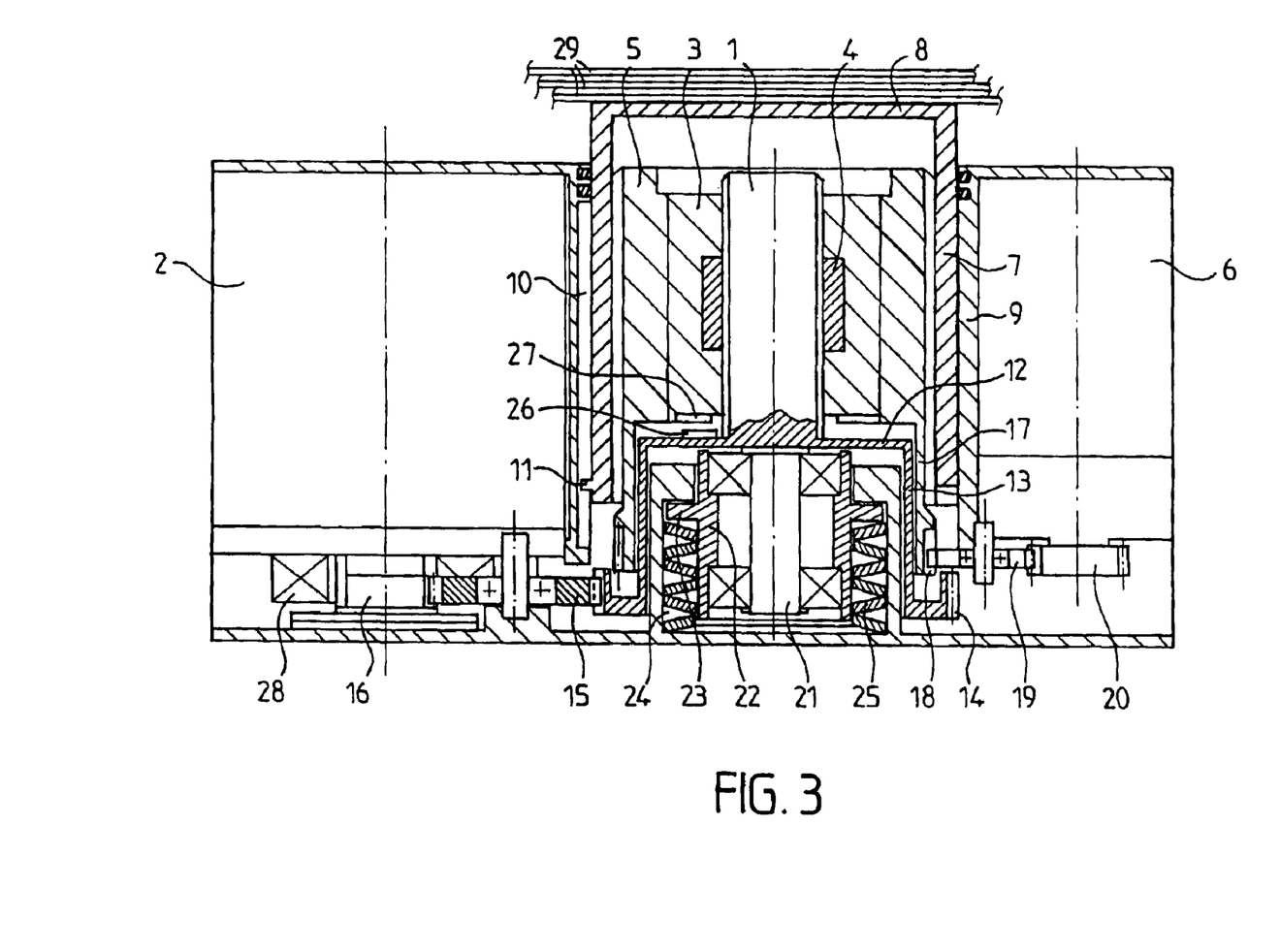
FIG. 3 is a schematic cross-sectional view showing the actuator during a service braking operation with worn disks.

FIG. 3 represents the actuator during a service braking operation with worn disks 29.

This figure differs from FIG. 2 solely in that second nut 7 and piston 8 have moved over annular screw 5 to bear against the worn disks and ensure that they are pressed together.

Figure 4:
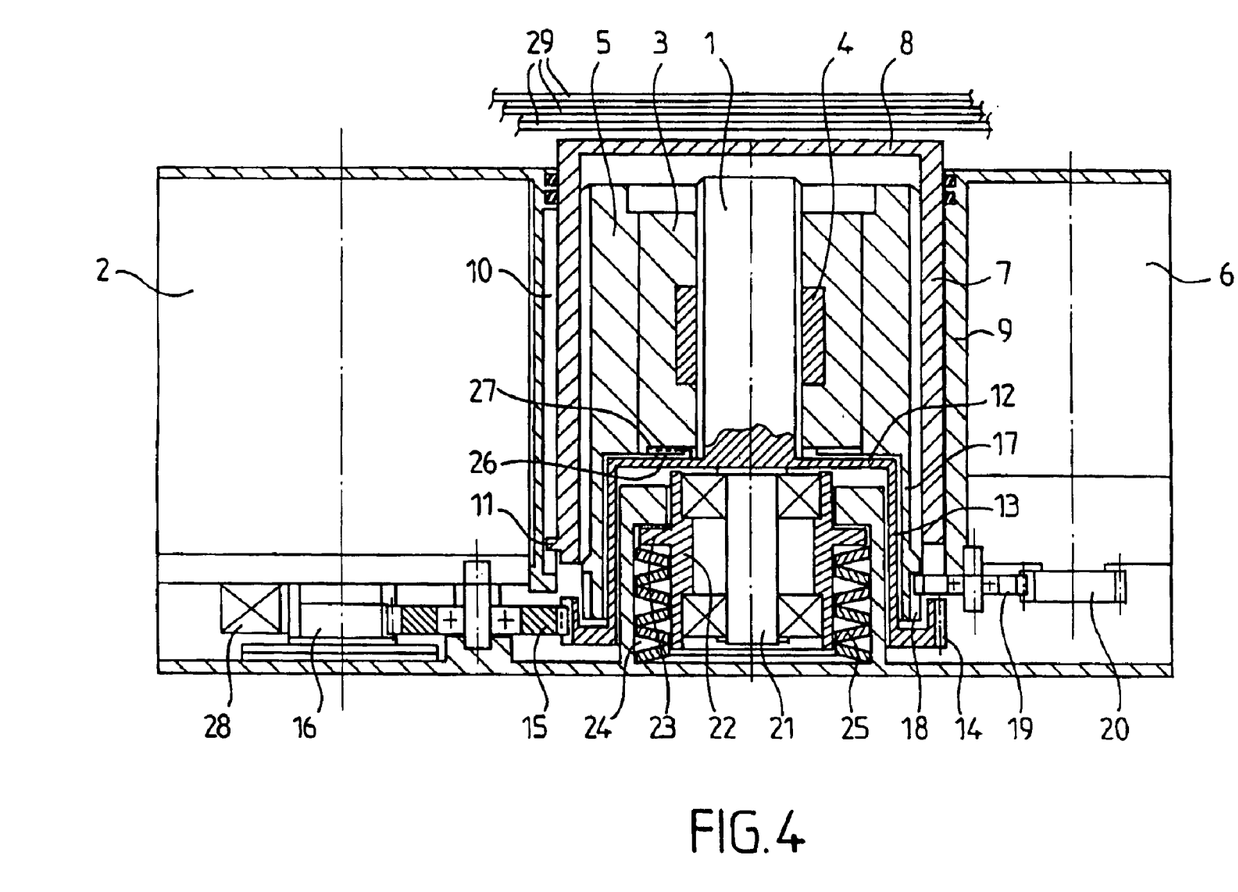
FIG. 4 is a view analogous to that of FIG. 1, but in which the brake is not applied and comprises worn disks.

FIG. 4 shows the actuator when it is not compressing worn disks 29 of the brake.

In this case, the assembly including the first nut, the annular screw and the second nut is in the position shown in FIG. 1, whereas second motor 6 has rotated annular screw 5 in the direction in which the second nut has moved towards worn disks 29 without, however, coming to bear against the nearest disk.

Piston 8 is in the position in which the play due to the wear of the disks has been taken up in accordance with the indications of the control system, which uses the measurements of the feeding current of first motor 2 and the rotation angle measurements supplied by sensor 28.

More precisely, when there is play and the service brake is actuated, piston 8 moves towards the disks without there being any increase in the feeding current of the first motor and then places them in contact with one another by causing the demand for feeding current of the first motor to increase.

Thus, by measuring this feeding current and by taking into account the indications provided by sensor 28, it is possible to control the first motor appropriately so that it moves piston 8 closer to the disks in such a way as to reduce the initial play automatically.

Figure 5:
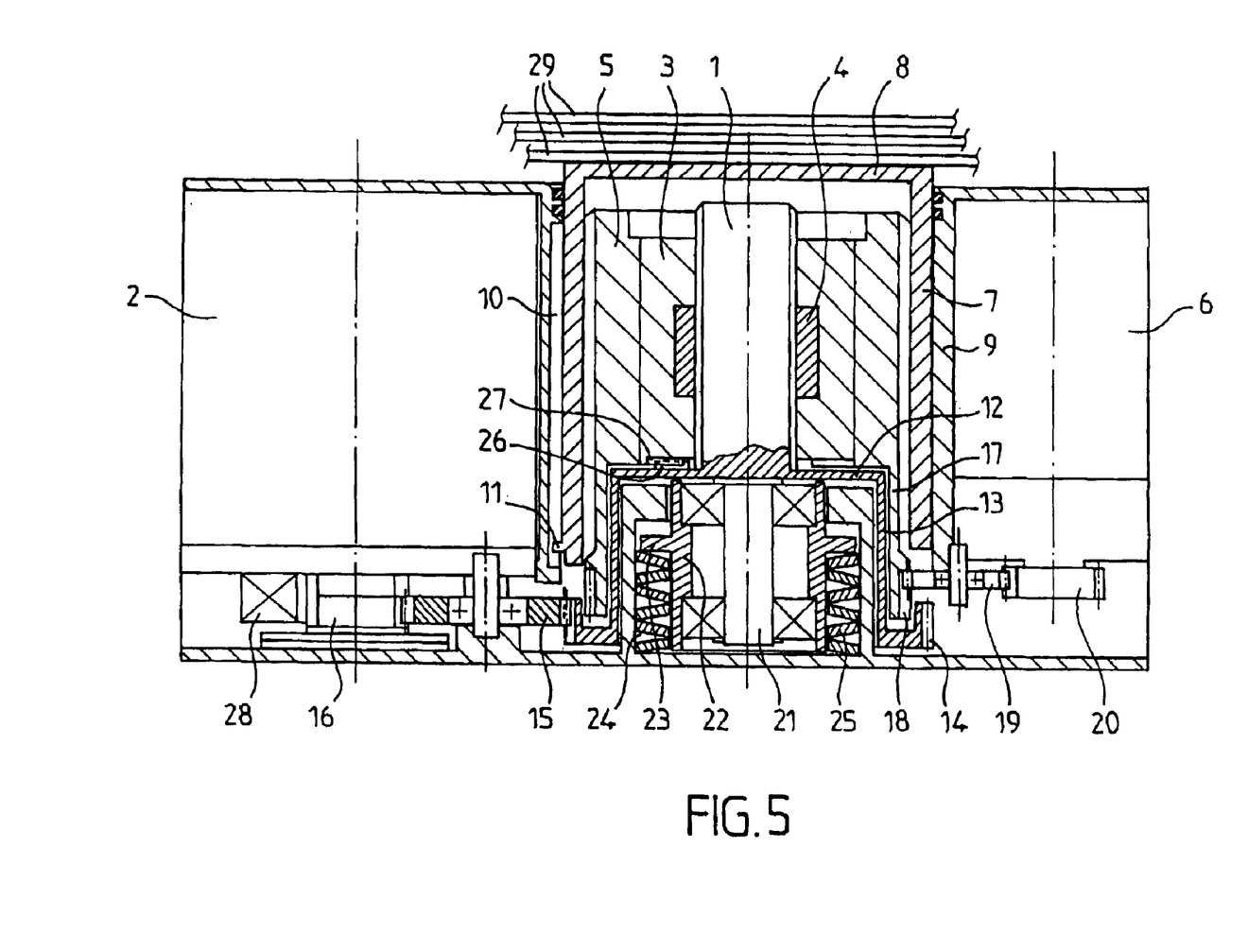
FIG. 5 is a schematic cross-sectional view showing the actuator during a parking braking operation, the disks being new and hot.

FIG. 5 shows the actuator during a parking braking operation with disks 29 that are new and very hot (their temperature being, for example, in the order of 300 to 400° C. following a service braking operation).

In this case, the second motor has rotated annular screw 5 in the direction in which second nut 7 has pressed piston 8 against disks 29, after which the assembly including the central screw, the first nut and the annular screw has moved back and further compressed elastic members 25.

As can be seen from FIG. 5, annular collar 23 of bearing 22 has moved away from the upper end of housing 24 provided in frame 9.

As to gears 15 and 19, these have continued to mesh with crown wheels 14 and 18 thanks to the relatively long length of the teeth of the latter.

Figure 6:
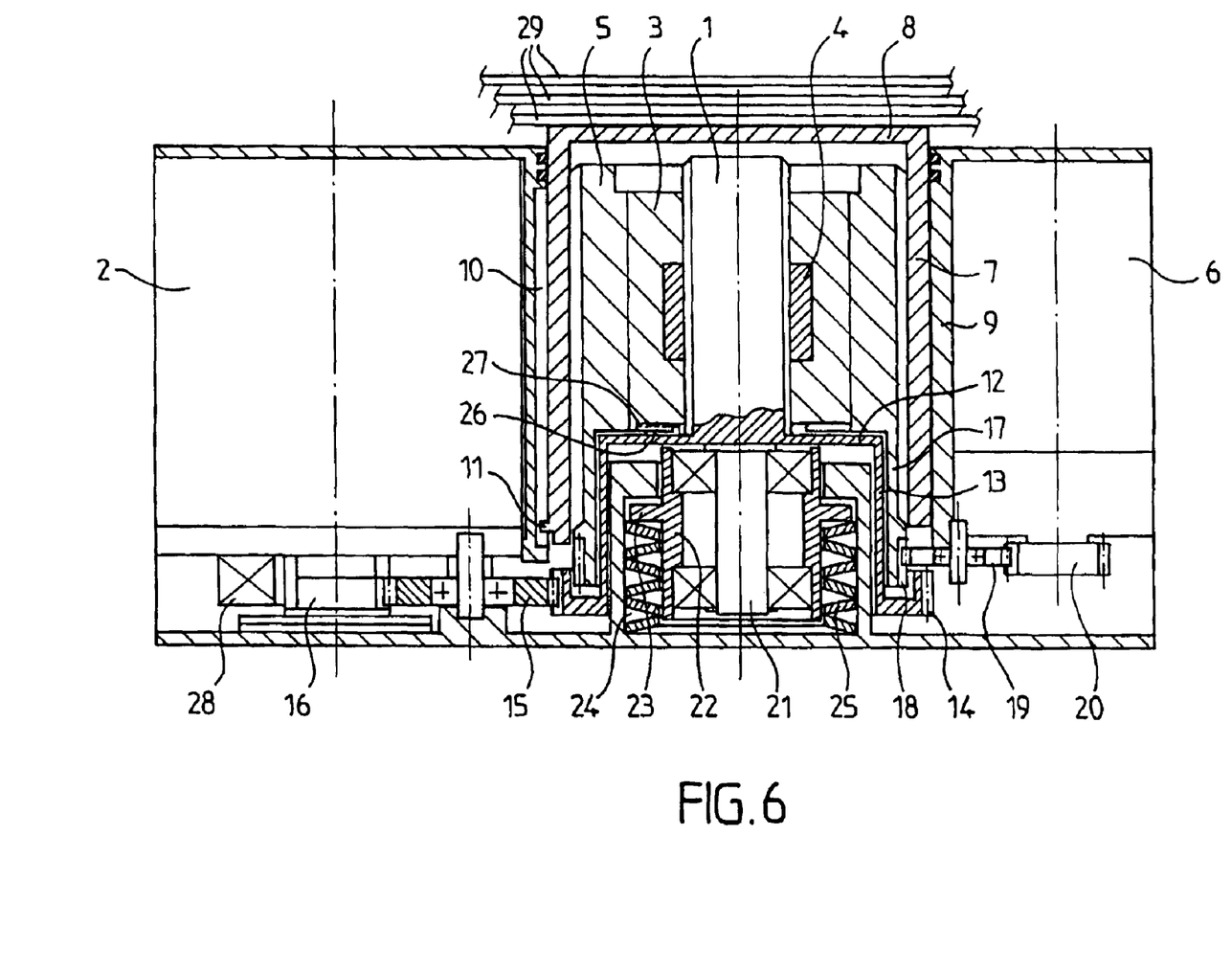
FIG. 6 is a schematic cross-sectional view showing the actuator during a parking braking operation after the disks have cooled down, the disks being new.

FIG. 6 shows the actuator during a parking braking operation with disks 29 that are new and the temperature of which has dropped considerably.

In this case, the disks have contracted upon cooling but they have continued to be pressed together through the action of elastic members 25 which have slightly expanded, pushing annular collar 23 of bearing 22, as well as the assembly including the central screw, the first nut and the annular screw, in the direction of the disks.

Figure 7:
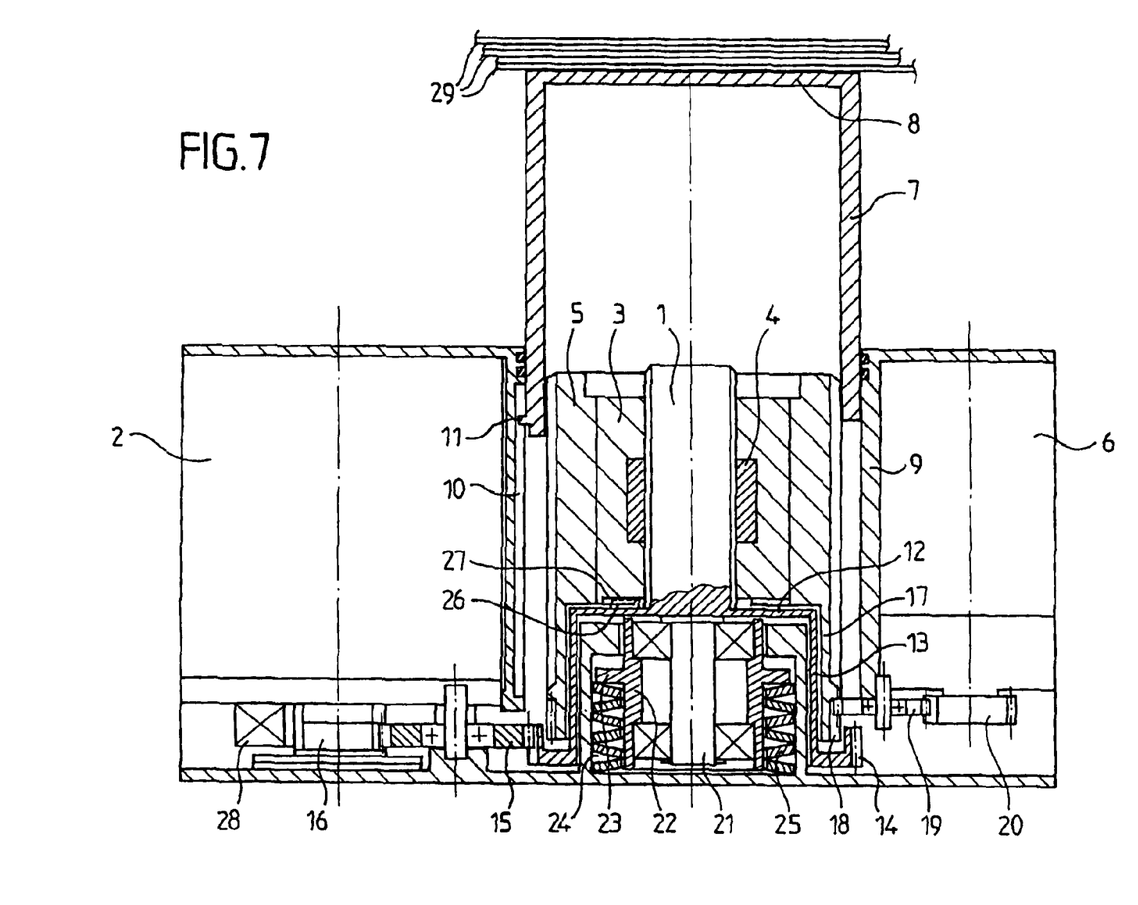
FIG. 7 is a schematic cross-sectional view showing the actuator during a parking braking operation, the disks being worn and hot.

Finally, FIG. 7 shows the actuator during a parking braking operation with, disks 29 that are worn and the temperature of which has not yet dropped following their heating through the effect of a service braking operation.

This figure differs from FIG. 5 solely in that second nut 7 has moved over a greater distance in the direction of disks 29 in order to allow for their wear.

It should be noted here that finger 11 of second nut 7 is located in the vicinity of the upper end of groove 10 of frame 9 and that it is thanks to finger 11 that the second nut has not been rotated during its displacement in the direction of the disks.

It should further be pointed out that piston 8 of the actuator according to the invention can be displaced over a distance of approximately 60 mm, its travel being far greater than that of the pistons of known electromechanical actuators. The performance of the actuator according to the invention is thus better that of said latter actuators.

What is claimed is:

1. Electromechanical multiple-disk brake actuator for a means of transport, in particular for an aircraft, characterized in that it includes, mounted on a frame (9):
   a first, reversible assembly including a central screw (1), a first electric motor (2) for rotating the central screw, a first nut (3) axially displaceable over the central screw when the latter is rotated, and means (4) interposed between the central screw and the first nut to permit reversible displacement of one, at least, of these two members; and
   a second, non-reversible assembly including an annular screw (5) externally integral with the first nut (3), a second electric motor (6) for rotating the annular screw and the first nut, a second nut (7) locked against rotation in relation to the frame (9) but axially displaceable over the annular screw when the latter is rotated, the annular screw (5) and the second nut (7) being in engagement via their threads which make their displacement non-reversible, and a piston (8) provided at one of the ends of the second nut (7) to press the disks (29) against one another in order to ensure the service braking of the means of transport during actuation of the first motor (2), and parking braking during actuation of the second motor (6), characterized further in that the central screw (1) comprises, on an opposite side from the piston (8), a cylindrical skirt (13) provided externally of a ring gear (14) meshing with an intermediate gear (15), itself meshing with a gear (16) keyed on an output shaft of the first motor (2).

2. Actuator according to claim 1, characterized in that the means (4) provided for permitting reversible displacement of the central screw (1) and/or of the first nut (3) are constituted by a roller bearing mechanism.

3. Actuator according to claim 1, characterized in that the means (4) provided for permitting reversible displacement of the central screw (4) and/or of the first nut (3) are constituted by a ball bearing mechanism.

4. Actuator according to claim 1, characterized in that the annular screw (5) comprises, on the side opposite from the piston (8), a cylindrical prolongation (17) at least partially surrounding the skirt (13) of the central screw (1) and provided externally of a ring gear (18) meshing with an intermediate gear (19), itself meshing with a gear (20) keyed on the output shaft of the second motor (6).

5. Actuator according to claim 1, characterized in that the central screw (1) bears a circular wall (12) extending perpendicularly to its axis of rotation, with this wall itself bearing the cylindrical skirt (13) at its periphery and being provided, on its outer face, with a protuberance (26) against which a protuberance (27), provided on the first nut (3) and having a matching shape, is designed to bear during parking braking.

6. Actuator according to claim 1, characterized in that a sensor (28) is provided to determine the angular position of the output shaft of the first motor (2) and to indicate the distance that the piston (8) has to travel in order to perform a service braking operation.

7. Multiple-disk brake for a means of transport, characterized in that it is controlled by several electromechanical actuators identical with the actuator defined in claim 1.

8. Electromechanical multiple-disk brake actuator for a means of transport, in particular for an aircraft, characterized in that it includes, mounted on a frame (9):
   a first, reversible assembly including a central screw (1), a first electric motor (2) for rotating the central screw, a first nut (3) axially displaceable over the central screw when the latter is rotated, and means (4) interposed between the central screw and the first nut to permit reversible displacement of one, at least, of these two members; and
   a second, non-reversible assembly including an annular screw (5) externally integral with the first nut (3), a second electric motor (6) for rotating the annular screw and the first nut, a second nut (7) locked against rotation in relation to the frame (9) but axially displaceable over the annular screw when the latter is rotated, the annular screw (5) and the second nut (7) being in engagement via their threads which make their displacement non-reversible, and a piston (8) provided at one of the ends of the second nut (7) to press the disks (29) against one another in order to ensure the service braking of the means of transport during actuation of the first motor (2), and parking braking during actuation of the second motor (6), characterized further in that the central screw (1) is axially displaceable, against the action of pre-compressed elastic members (25), in the direction wherein it moves away from the multiple disks (29) during parking braking.

9. Actuator according to claim 8, characterized in that the central screw (1) comprises, on the opposite side from the piston (8), a cylindrical skirt (13) provided externally of a ring gear (14) meshing with an intermediate gear (15), itself meshing with a gear (16) keyed on the output shaft of the first motor (2).

10. Actuator according to claim 8, characterized in that the elastic members (25) are disposed in an annular housing (24) provided in the frame (9), coaxially with the central screw (1), and pre-compressed between the end of the housing located opposite from the multiple disks (29) and an annular collar (23) borne by a bearing (22) against which bears a stub shaft (21) axially prolonging the central screw (1), the collar (23) being pressed against the other end of the housing (24) during service braking and not during parking braking.

11. Actuator according to claim 10, characterized in that the elastic members (25) are deformable washers.

12. Actuator according to 11, characterized in that the central screw (1) comprises, on an opposite side from the piston (8), a cylindrical skirt (13) provided externally of a ring gear (14) meshing with an intermediate gear (15), itself meshing with a gear (16) keyed an the output shaft of the first motor (2) and the annular housing (24) of the frame (9) extends at least in part inside the cylindrical skirt (13) of the central screw (1).

* * * * *